United States Patent [19]

Kobayashi et al.

[11] Patent Number: 4,510,374

[45] Date of Patent: Apr. 9, 1985

[54] FLUX-CORED WIRE ELECTRODE SUITABLE FOR USE IN GAS-SHIELDED ARC-WELDING

[75] Inventors: Minoru Kobayashi; Yoshiya Sakai; Shoji Minato; Tsuguo Ooe; Katsumi Arai, all of Kanagawa; Tetsuo Suga, Yokohama, all of Japan

[73] Assignee: Kabushiki Kaisha Kobe Seiko Sho, Kobe, Japan

[21] Appl. No.: 556,602

[22] Filed: Nov. 30, 1983

[30] Foreign Application Priority Data

Dec. 6, 1982 [JP] Japan ................................ 57-213764

[51] Int. Cl.$^3$ ............................................. B23K 35/00
[52] U.S. Cl. .............................. 219/146.1; 219/146.24
[58] Field of Search ................... 219/145.22, 145.31, 219/146.1, 146.24, 146.3, 146.32

[56] References Cited

U.S. PATENT DOCUMENTS 4,245,145 1/1981 Maniar et al. ................... 219/146.1
4,366,364 12/1982 Arai et al. ....................... 219/146.24
4,397,811 4/1983 Puschner et al. ............. 219/145.22 X

FOREIGN PATENT DOCUMENTS

84195 7/1981 Japan ................................ 219/146.1
72795 5/1982 Japan ................................ 219/146.1

*Primary Examiner*—Roy N. Envall, Jr.
*Assistant Examiner*—C. M. Sigda
*Attorney, Agent, or Firm*—Oblon, Fisher, Spivak, McClelland & Maier

[57] ABSTRACT

A flux-cored wire electrode suitable for use in gas-shielded arc-welding, characterized in that the sum of the carbon content in the sheath made of soft steel and the carbon content in a lubricant adhered on the sheath is 0.045 wt. % or lower relative to the total weight of the sheath and a flux, which contains 20-50 wt. % of $TiO_2$, 1-15 wt. % of $SiO_2$, 2.5-10 wt. % of $ZrO_2$, 0.1-5 wt. % of an arc-stabilizing agent, 10-45 wt. % of a deoxidizer and up to 50 wt. % of iron powder, all based on the total weight of the flux, is filled to an amount of 10-30 wt. % of the total weight of the wire electrode in the cavity surrounded by the sheath. The above flux-cored wire electrode features a low fume emission rate comparable with that of a solid wire electrode.

10 Claims, 16 Drawing Figures

FIG. 9 RELATION BETWEEN SHIELDING GAS COMPOSITION (Ar-$CO_2$ SYSTEM) AND FUME EMISSION RATE

FLUX-CORED WIRE ELECTRODE SUITABLE FOR USE IN GAS-SHIELDED ARC-WELDING

BACKGROUND OF THE INVENTION (1) Field of the Invention

This invention relates to a flux-cored wire electrode suitable for use in gas-shielded arc-welding, and more specifically to a flux-cored wire electrode which permits one to reduce the emission of welding fume to the same level as solid wire electrodes and is particularly suited to weld soft steel and high tensile steel.

(2) Description of the Prior Art

The use of flux-cored wire electrodes has been increasing for gas-shielded arc-welding work, because flux-cored wire electrodes have such advantages that they assure easy and efficient welding work and, especially, they feature good arc stability, produce less spatter and hence give excellent bead appearance. However, their most serious problem is that they are accompanied by a great deal of emission of welding fume. The emission of such welding fume may reach as much as 1.5-2.0 times the welding fume generally emitted when a solid wire electrode is used. Emission of a large volume of fume causes a problem from the viewpoint of labor hygiene for welding workers. Besides, it becomes difficult to see the weld line due to fume when welding in a poorly-ventilated room, thereby raising another problem that the accuracy of the welding is lowered.

As methods for solving such problems, it has been contemplated to practice such countermeasures as (1) reduction of the fume concentration by ventilation; (2) suction and discharge of fume through a duct or the like provided near the site of welding work; (3) wearing of dust mask; and (4) reduction of fume through improvements to welding materials and method. Regarding the countermeasures (1) through (3) out of the above-referred to countermeasures, a variety of methods and apparatus has already been proposed. These proposals are however posterior measures and cannot be considered as any break-through and perfect countermeasures. It should be considered as the most important countermeasure against fume to lower the emission of fume, as indicated as the countermeasure (4) above. No sufficient investigations have however been made on this point.

With the foregoing in view, the present inventors have carried out research with a view toward achieving the lowering of fume emission of flux-cored wire electrodes, which are suitable for use in gas-shielded arc-welding, from the aspect of materials making them up. As a result, it has already found that the emission of fume can be reduced to a considerable extent when the carbon content in the covering soft steel making up a sheath and the carbon content in a residual lubricant adhered in the forming step of the flux-cored wire electrode are lowered as much as possible. In the course of proceeding with the research further, it has also been found that the emission of fume can be lowered further when the composition of the filled flux is suitably adjusted in addition to the above-mentioned reduction in the carbon contents, leading to completion of this invention.

SUMMARY OF THE INVENTION

An object of this invention is to provide a flux-cored wire electrode suitable for use in gas-shielded arc-welding, which wire electrode emits welding fume at the same low level as solid wire electrides.

According to the present invention, there is provided a flux-cored wire electrode suitable for use in gas-shielded arc-welding, which electrode is characterized in that the sum of the carbon content in the sheath made of soft steel and the carbon content in a lubricant still adhered on the sheath is 0.045 wt.% or lower relative to the total weight of the sheath and a flux, which contains 20-50 wt.% of $TiO_2$, 1-15 wt.% of $SiO_2$, 2.5-10 wt.% of $ZrO_2$, 0.1-5 wt.% of an arc-stabilizing agent, 10-45 wt.% of a deoxidizer and up to 50 wt.% of iron powder, all based on the total weight of the flux, is filled to an amount of 10-30 wt.% of the total weight of the wire electrode in the cavity surrounded by the sheath.

In another aspect of this invention, the above flux may further contain 1-15 wt.% of $Al_2O_3$, 0.1-10 wt.% of MgO and 1-10 wt.% of iron oxides, all based on the total weight of the flux.

The flux-cored wire electrode of this invention has succeeded in lowering its fume emission to the same level as solid wire electrodes.

The above and other objects, features and advantages of the present invention will become apparent from the following description and the appended claims, taken in conjunction with the accompanying drawings.

BRIEF DESCRIPTION OF THE DRAWINGS

In the accompanying drawings:

FIGS. 8-10, labelled reference photos 1-3, are high speed photos taken of the explosion of suspended welding droplets.

DETAILED DESCRIPTION OF THE INVENTION AND PREFERRED EMBODIMENTS

As mentioned above, the present inventors have already found that the fume emission rate can be significantly reduced when the carbon content in the sheath-forming soft steel and the carbon content in the remaining lubricant are both lowered (more specifically, to 0.045 wt.% or lower relative to the total weight of the sheath). The present inventors have then proceeded with a further research on other approaches, without being fully satisfied with the result of the above finding. The composition of the flux was chosen and subjected to an investigation.

Figure 1:
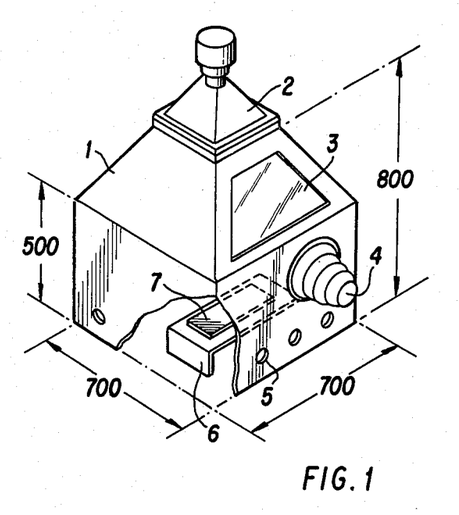
FIG. 1 is a partially cut-away perspective view of an apparatus employed in the measurement of emitted fume.

Taking a hint from the fact that the fume emission rate of a flux-cored wire electrode is considerably higher than that of a solid wire electrode, the present inventors assumed that the filled flux is closely related to the emission of fume. Certain basic experiments were thus conducted in order to clarify the relationship between the composition of a flux and fume emission rate. Incidentally, there have been known, as filling fluxes, those containing slag-forming agents, arc-stabilizing agents, deoxidizers, iron powder, etc. They may be classified into titania-base fluxes, lime/titania-base fluxes, lime-base fluxes, etc., in accordance with the kinds and the inclusion or exclusion of flag-forming agents, the basicity of slag and the like. When performing the experiments, a titania-base flux which had the lowest fume emission rate was used as a standard composition. By changing the content of each of the slag-forming agent ($TiO_2$, $SiO_2$, $Al_2O_3$, $ZrO_2$, $Fe_3O_4$, $MgO$), arc-stabilizing agent (NaF), deoxidizer (Mn) and iron powder, which are principal components of titania-base fluxes, the relationship between each of the principal components and fume emission rate was investigated. The below-described sample wire specification and welding conditions were used in the investigation. The measurement of each fume emission rate was carried out by collecting fume, which was emitted upon conducting an welding operation in accordance with the procedure prescribed in JIS (Japan Industrial Standard) Z3930, in its entirety by means of a high-volume air sampler in an apparatus as illustrated in FIG. 1 with a part thereof cut away (in FIG. 1, 1: collection box, 2: sampler, 3: observation window, 4: access opening, 5: air-feeding holes, each of 40 mm in diameter, 6: welding table, and 7: sample plate) so as to determine the fume emission rate per unit time (mg/min), repeating the experiment three times, and then calculating an average of the fume emission rates in the three experiments. (Sample wire and welding conditions):

Electrode wire

Figure 2:
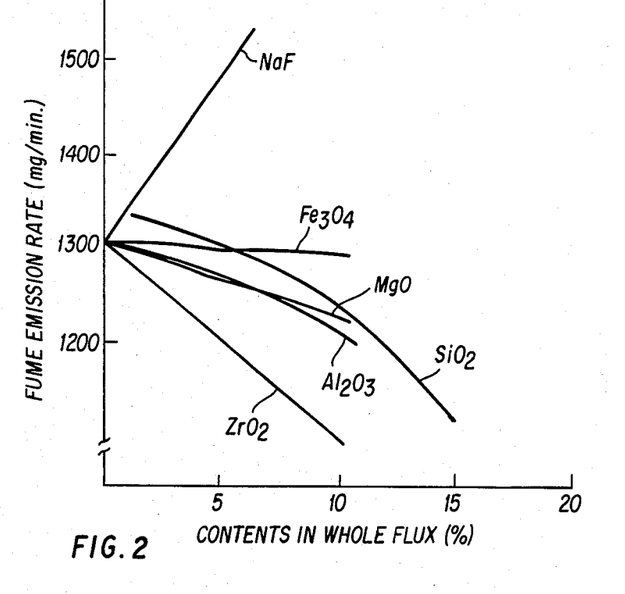
FIG. 2 and FIG. 3 are each a diagram showing the relationship between fume emission rate and flux components.
Figure 8A:
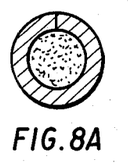
FIG. 8(A)-FIG. 8(D) are schematic illustrations showing the cross-sections of flux-cored wire electrodes.
Figure 8B:
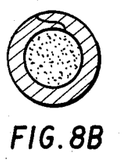
Figure 8C:
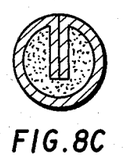
Figure 8D:
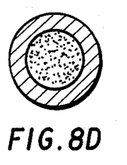

Sheath-forming metal: Soft steel
Flux: Titania-base flux
Flux content: 15 wt.%
Lubricant: $MoS_2$-base lubricant
Cross-sectional shape: As illustrated in FIG. 8(A) which will be described herein.
Wire diameter: 1.6 mm Welding conditions Welding current: 300 A, DC(+)
Welding voltage: 32 V
Welding speed: 30 cm/min
Shielding gas: $CO_2$, 20 liters/min
Distance between electrode tip and work piece: 17 mm
Work piece: 12 mm', soft steel
Welding method: Bead-on-plate method
Results are diagrammatically shown in FIG. 2 and FIG. 3.

Figure 3:
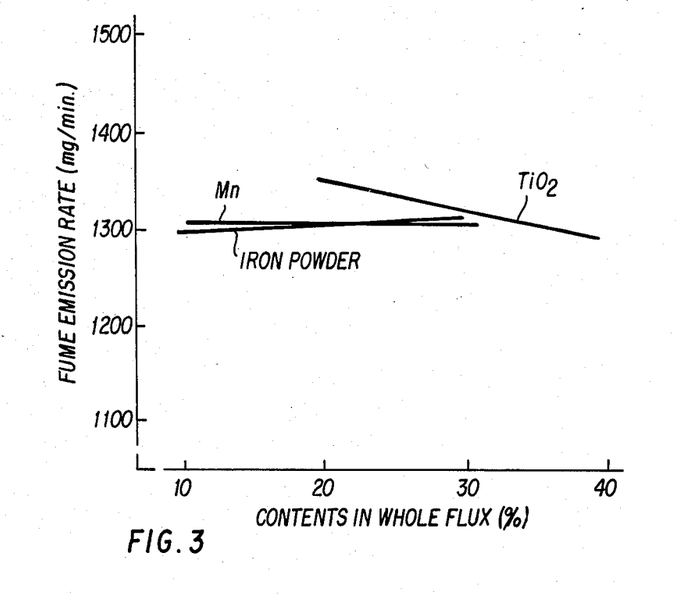
Figure 4:
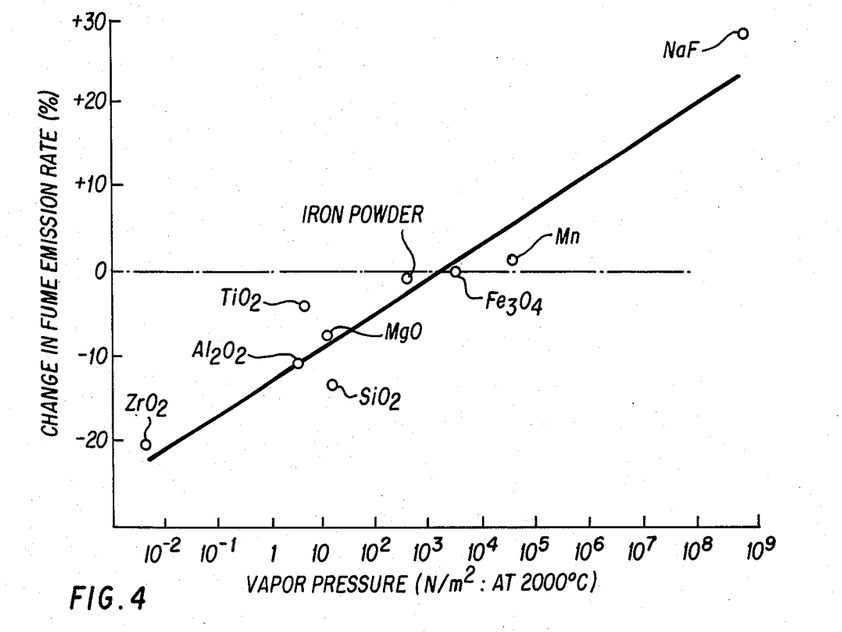
FIG. 4 is a diagram showing the relationship between the vapor pressures of flux components and fume emission rate.

As apparent from FIG. 3 and FIG. 4, the fume emission rate is inversely proportional to the content of each of $ZrO_2$, $Al_2O_3$, $SiO_2$, $TiO_2$ and MgO but is proportional to the content of NaF. However, the content of each of Mn, $Fe_3O_4$ and iron powder has extremely little influence to the fume emission rate. In FIG. 4, the vapor pressure on each flux component is plotted along the horizontal axis while the extent of an increase or reduction in fume emission rate per unit weight proportion of each component is plotted along the vertical axis, both based on data obtained in the above experiment. It is envisaged that $ZrO_2$, $SiO_2$, $Al_2O_3$, MgO and $TiO_2$ act toward reducing the fume emission rate, NaF serves toward increasing the fume emission rate, and iron powder, $Fe_3O_4$ and Mn have little connection to an increase or decrease in the fume emission rate. As clearly understood from the above-described results, the amounts of high-temperature vapors in an arc decrease and the fume emission rate hence decreases as components having lower vapor pressures increase, because the relative contents of components having high vapor pressures decrease.

In the present invention, the content of each component of a flux has been limited as will be described below while taking into consideration its aforementioned influence to the fume emission rate and its inherent properties required as a flux component.

$TiO_2$: 20–50 wt.%

As mentioned above, $TiO_2$ is effective in reducing the fume emission rate and, besides, is a component indispensable for improving the stability of an arc and the slag-covering property. Its content must be at least 20% of the total weight of each flux. Any $TiO_2$ contents exceeding 50 wt.% result in excessively-high slag viscosity, whereby making the shapes of beads poor and, as a result of inclusion of excess reduced titanium and titanium oxide still remaining in the thus-welded metal, lowering the mechanical properties (especially, toughness) of the metal weld.

$SiO_2$: 1–15 wt.%

$SiO_2$ is also effective in reducing the fume emission rate. Besides, it is effective in making bead shapes well. These effects are exhibited to noticeable extents when $SiO_2$ is added in an amount of 1% or more. When the content of $SiO_2$ exceeds 15%, the viscosity of fused slag is lowered, thereby adversely affecting the easiness and efficiency of welding work, aggravating the appearance and shape of each bead, and reducing the toughness of the welded metal.

$ZrO_2$: 2.5–10 wt.%

$ZrO_2$ is a component not only extremely effective in reducing the fume emission rate but also capable of enhancing the slag coverability. In order to draw out these effects of $ZrO_2$ to significant extents, it is necessary to add $ZrO_2$ in an amount of 2.5% or higher. Due to the high solidification point of $ZrO_2$, $ZrO_2$ has a danger of inducing such defects as slag inclusion when added in excess of 10%.

Arc-stabilizing agent: 0.1–5 wt.%

As arc-stabilizing agents, may be mentioned materials capable of undergoing ready ionization in arcs, for example, the oxides, fluorides, carbonates, nitrates and the like of Li, Na, K, Rb, Cs, Ca, Sr, Ba, etc. When incorporated in any amounts lower than 0.1%, arcs are still unstable and some problems are developed from the viewpoint of the readiness and efficiency of welding work, for example, occurrence of frequent spattering. On the other hand, the arc-stabilizing agent, for example, NaF has a high vapor pressure as shown in FIG. 4 and tends to increase the fume emission rate. Therefore, it is necessary to limit the content of the arc-stabilizing agent below 5% so as to avoid such a problem.

Deoxidizer: 10–45 wt.%

A deoxidizer is, as estimated from its own name, a component effective in reducing the contents of non-metals included in a welded metal and thus improving the physical properties of the welded metal owing to its deoxidizing action. As representative deoxidizers, may be mentioned such metals as Mn, Si. Al, Mg, Ti, Zr and the like as well as their iron alloys. When a deoxidizer is used in any amounts lower than 10%, the deoxidation is insufficient, leading to poor X-ray examination results. Accordingly, a deoxidizer must be added in an amount of 10% or higher. When the content of a deoxidizer exceeds 45%, the deoxidixation becomes too much and the toughness and anti-cracking property of the welded metal are hence lowered. A deoxidizer does not give any significant influence to the fume emission rate as apparent from the results of Mn illustrated by way of example in FIG. 4. However, Mg is an exception and tends to increase the fume emission rate. Therefore, it is desirable to lower the content of a deoxidizer as much as possible when Mg is used as the deoxidizer.

Iron powder: up to 50 wt.%

As illustrated in FIG. 4, iron powder gives almost no influence to the fume emission rate. However, it acts to increase the deposition rate and to improve the welding efficiency. Therefore, iron powder may be incorporated up to 50 wt.%. When the content of iron powder exceeds 50%, the relative content of the slag-forming agent is decreased, thereby aggravating the shapes of beads and, in addition, inducing the occurrence of welding defects such as pits and blowholes due to insufficient shielding.

$Al_2O_3$, MgO and iron oxides, which will be described below, are not always essential components but are also effective in reducing the fume emission rate. Therefore, it is desirous to add them.

$Al_2O_3$: 1-15 wt.%

$Al_2O_3$ is also a component effective in reducing the fume emission rate. In addition, it has another effect to raise the solidification temperature of slag and hence to improve the shapes of beads in vertical welding. In order to draw out these effects of $Al_2O_3$ without failure, it is required to add $Al_2O_3$ in an amount of at least 1%. When $Al_2O_3$ is contained in any amounts exceeding 15%, it tends to develop such defects as slag inclusion and to lower the removability of slag, and to increase non-metallic inclusion in the welded metal and thus to lower the toughness of the welded metal.

MgO: 0.1-10 wt.%

MgO is also effective in reducing the fume emission rate. In the present invention, MgO may preferably be added for its effects in improving the slag coverability and bead shapes as well as the toughness and ductility of welded metals rather than its fume-lowering effect. In order to draw out these effects of MgO to noticeable extents, it is required to add MgO in an amount of 0.1% or higher. If MgO is too high on the contrary, the viscosity of fused slag is considerably lowered, thereby extremely aggravating the easiness of welding manipulation and making bead shapes poor. Therefore, the upper content limit of MgO should be set at 10%.

Iron oxides: 1-10 wt.%

Iron oxides may include FeO, $Fe_2O_3$ and $Fe_3O_4$ as well as individual minerals containing such iron oxides as their main components and mixtures of such minerals. As readily envisaged from $Fe_3O_4$ given by way of example in FIG. 4, iron oxides do not give any substantial effects to the fume emission rate. It is however effective to add iron oxides in a total amount of 1% or more, because they improve the slag coverability and bead shapes. If the content of such iron oxides exceeds 10%, arcs are rendered unstable and spattering occurs frequently, and the viscosity of slag is lowered and the coverability of the slag is lowered further.

The composition of a filling flux useful in the practice of this invention has been described above. As a still further parameter affecting the fume emission rate, there is the $H_2$ content in each wire electrode. The fume emission rate decreases as the $H_2$ content becomes lower, because the temperature of an arc arises owing to the high ionization voltage of $H_2$ and the concentrations of metal vapors, which serve as sources for fume, increase when $H_2$ penetrates into the arc. These disadvantageous effects of $H_2$ appear very noticeably when the $H_2$ content in a wire electrode reaches about 50 ppm or higher. Therefore, it is desirable to limit the $H_2$ content below the above-mentioned level in each wire electrode.

It is possible to lower the fume emission rate to a considerable extent by controlling the contents of components in a filling flux. However, such an adjustment in flux composition can by itself lower the fume emission rate by about 10-20% only and cannot be considered as any satisfactory solution for the reduction of fume emission rate. Namely, the object of this invention is to lower the fume emission rate to the levels of fume emission rates of solid wire electrodes. In order to achieve this object, it is necessary to lower the fume emission rate by about 40-50 % compared with the fume emission rates of conventional flux-cored wire electrodes.

Therefore, with a view toward achieving a further reduction in the fume emission rate, an additional investigation has been carried out, on basis of the above-obtained finding, with respect to the relationship between the carbon contents in sheath-forming soft steel and residual lubricant adhered in the production process of a flux-cored wire electrode and the fume emission rate.

As will be described next, electrode wires having different carbon contents relative to the total weights of their respective sheaths were produced using soft steel and lubricant samples having different carbon contents. Their fume emission rates were then determined by conducting a welding test under the same conditions as employed in the experiment whose results are diagrammatically shown in FIG. 2 and FIG. 3.

Electrode wire

Wire diameter: 1.6 mm

Carbon content in sheath-forming soft steel: 0.005-0.08 wt.%

Flux: Titania-base flux

Flux content: 15 wt.%

Lubricant: $MoS_2$-base lubricant (carbon content: 20-50 wt.%; amount adhered: 0.01-1.10 wt.% of sheathforming soft steel)

Cross-sectional shape: As illustrated in FIG. 8(A)

Flux composition: Composition No. 2 in Table 3 which will be given later.

Figure 5:
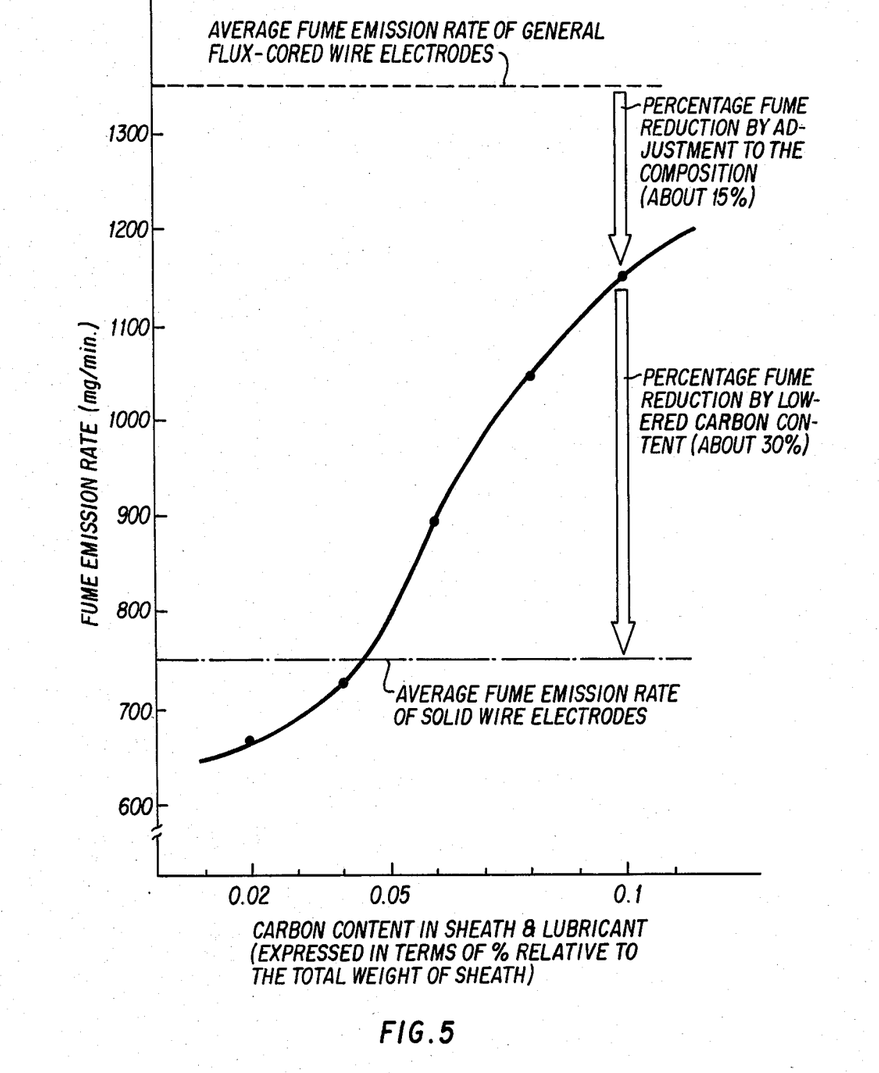
FIG. 5 is a diagram showing the relationship between the total carbon content in sheath-forming soft steel and remaining lubricant and fume emission rate.

Results are shown in FIG. 5. Namely, there is clear relationship between the carbon contents relative to the total weight of sheath and the fume emission rate. A reduction in the above carbon contents has achieved an epochal effect in suppressing the fume emission rate.

Generally speaking, the carbon contents in the sheath-forming soft steel and flux of a flux-cored wire electrode (the term "carbon contents" will hereinafter be called "the total carbon content" for brevity) is about 0.07 wt.% or higher. It is thus clear that the fume emission rate is affected not only by the composition of the filling flux but also by the total carbon content to significant extents. Incidentally, the above-described flux of the low fume level composition was used as a filling flux for a flux-cored wire electrode employed in the experiment, the results of which experiment are shown in FIG. 5. However, the fume-reducing effect is limited to about 15%, no matter how much the total carbon content is reduced. When the total carbon content is limited at a low level in addition to a suitable adjustment to the flux composition, the fume-reducing effect can be significantly increased. The fume emission rate may be lowered to the levels of fume emission rates of solid wire electrodes when the total carbon content is reduced to 0.045% or less. The fume emission rate may be lowered to one half of that of a conventional flux-cored wire electrode provided that the total carbon content is limited below 0.02%, thereby successfully achieving the object of fume reduction.

Figure 6A:
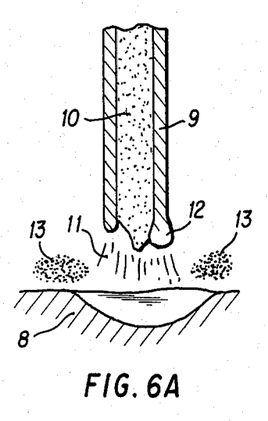
FIG. 6(A) and FIG. 6(B) are respectively cross-sectional views illustrating the manner of fume emission.
Figure 6B:
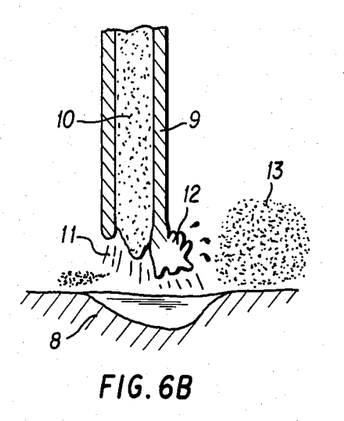

Reasons for the significant influence of the total carbon content to the fume emission rate were clarified by the following verification experiment. First of all, FIG. 6(A) and FIG. 6(B) are schematic illustrations showing the manner of welding work, namely, are illustrations obtained by observing the arc-producing portions with high-speed cameras in order to investigate the manner of fume occurrence when the welding works were carried out using flux-cored wire electrodes. In the drawings, numerals 8 and 9 indicate a work piece and a sheath-forming soft steel respectively. Designated at numeral 10 is a flux. At numerals 11 and 12, are shown an arc and droplet respectively. Fume is indicated by numeral 13. As apparent also from these drawings, the sheath-forming soft steel 9 is fused by the heat of the arc and the droplet 12 is thus formed (see, FIG. 6(A)), in a welding process. Many droplets are successively allowed to the mother plate 8 to proceed with the welding. When the droplet 12 suspended from the tip of the wire electrode has exploded and the arc 11 has then been disturbed (see, FIG. 6(B)), a great deal of fume 13 occurs. The occurence of the fume 13 may be attributed to an assumption that metal vapors and the like, which are present in the arc atmosphere and serve as causes for fume, are released to the outside of the arc atmosphere due to the disturbance of the arc. Thus, the fume emission rate should be lowered if the explosion of the droplet 12 is avoided and the disturbance to the arc is minimized. Thus, the present inventors looked for the principal cause for the occurrence of explosion of the droplet 12. As a result, it has been found that the above-described explosion takes place when carbon contained in a wire electrode has undergone a reaction with oxygen in the arc atmosphere and has formed CO gas or $CO_2$ gas. Namely, the generation rates of CO and $CO_2$ decrease upon converting the sheath-forming soft steel into droplets, the explosion of droplets is minimized and the fume emission rate is thus lowered when the carbon content in the sheath-forming soft steel decreases. REFERENTIAL PHOTO 1, REFERENTIAL PHOTO 2 and REFERENTIAL PHOTO 3 are respectively high-speed pictures (2000 frames/second) illustrating the manner of explosion of suspended droplets, when flux-cored wire electrodes made respectively of sheath-forming soft steels having carbon contents of 0.01%, 0.04% and 0.08% were used to conduct welding. The explosion of a droplet became extremely violent as the carbon content increased.

As readily understood from the above fact, there is nothing better than minimizing the carbon content in each flux to be filled. As shown in FIG. 6(A) and FIG. 6(B), a flux core and droplets are easy to separate and CO or $CO_2$, which may generate from the flux core, does not significantly trigger the explosion of the droplets. Therefore, inclusion of carbon at a low level may be tolerated. It is however desirable to limit the carbon content in each flux below 0.2%, because any carbon contents beyond the above-mentioned level promote the explosion of droplets and hence increase the fume emission rate.

As a sheat-forming soft steel useful in the practice of this invention, may be mentioned a cold-rolled or hot-rolled steel having good deep drawability in view of its formability. As apparent from the above-mentioned object of this invention, a soft steel containing carbon at a level as low as possible should be used. Since Mn, Si and the like act as deoxidizers and have effects to suppress the generation of CO and $CO_2$, it is preferable to add them to certain extents. They however reduce the machinability if contained too much. Therefore, it is desirable to limit the Mn content and Si content to 2.0% or less and 1.0% or less respectively, both in the sheath-forming soft steel.

The term "lubricant" as used herein means a drawing lubricant which is used when producing a flux-cored wire electrode. It is possible to use drawing lubricants of the higher fatty acid ester type (i.e., the Na, K, Ca, Mg and Ba esters of higher fatty acids and the like), $MoS_2$-base lubricants, Teflon-base lubricants, Graphite-base lubricants, and all other conventionally-known lubricants. These lubricants contain carbon at considerably high levels. It is therefore necessary to use the lubricant as little as possible in the course of each drawing operation so as to lower the amount of the lubricant adhered on the surfaces wire electrodes; or to subject drawn electrode wires to baking, brushing, solvent-washing and the like so that the total carbon content of each sheath is kept below the prescribed level. However, the feeding readiness of a wire electrode is too poor when carrying out welding work if the amount of a lubricant left on the surface of the wire electrode is too little. Accordingly, it is advantageous to use a lubricant having a low carbon content (preferably 50% or lower). From this viewpoint, it is most preferable to use an $MoS_2$-base lubricant.

Turning now to the flux, it is preferable to fill the flux to a content in the range of 10–30% based on the total weight of the wire electrode. If the content of the flux is lower than 10%, it is unable to incorporate metal powder and slag-forming agent to any sufficient levels. On the other hand, any flux contents in excess of 30% require to make the thickness of the sheath, which is made of soft steel, smaller. This renders the wire electrode soft, resulting in poor feeding readiness, reduced conductivity and arc-stability which induce the formation of undercuts and the like, and difficulty in performing welding with large heat.

Figure 7:
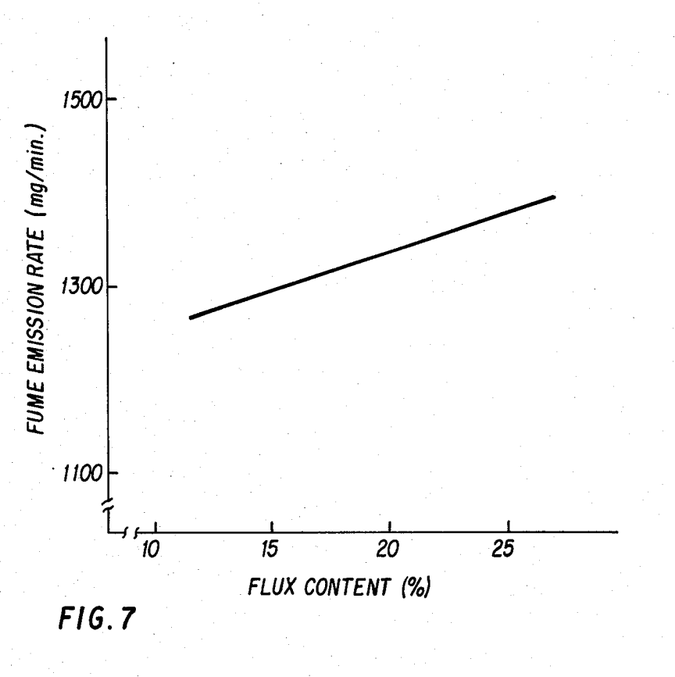
FIG. 7 is a diagram showing the relationship between flux content and fume emission rate.

As illustrated in FIG. 7, the fusing rate becomes greater and the fume emission rate tends to increase slightly as the flux content becomes higher. Thus, it is desirable to limit the flux content below 20%. Therefore, it is desirable to limit the flux within the range of 10–20% of the total weight of each wire electrode. The sample wires, welding conditions and fume weight measurement method used in the experiment whose results are shown in FIG. 7 were the same as those used in the experiments whose results are respectively shown in FIG. 2 and FIG. 3.

There is no limitation on the cross-sectional shape of each wire electrode. For example, it is feasible to form wire electrodes into the various shapes illustrated in FIGS. 8(A), 8(B), 8(C) and 8(D). In the case of the shape (D) which does not contain any seam in the surface of the sheath, the surface of the wire electrode may be plated with Cu, Al (inclusive of an Al-Si alloy), Ni or Cr. Among these metals, use of Cu is desirous because Cu is excellent in cost, conductivity and corrosion resistance. This plating treatment is effective also in reducing the fume emission rate, because the plating lowers the fusing rate of the wire electrode. The weight of the plating is desirously from 0.05 to 0.30% by weight based on the total weight of each wire electrode. When applied to a thickness of 0.05% or thinner, the plating cannot show any advantageous effect to rust resistance, feeding readiness, fume reduction and the like. If the weight percentage of the plating becomes higher than 0.30%, the productivity is reduced and the toughness of the welded metal is lowered. Therefore, the thickness of each plating should be controlled so that its weight proportion remains below the above-described upper limit. In addition, the diameter of each wire electrode may be chosen at will from the groups of 1.2 mm, 1.6 mm, 2.0 mm, 2.4 mm, 3.2 mm and so on, depending what end use would be made on the wire electrode.

The present invention is constituted as outlined above and has made it possible to lower the fume emission rate per se to a considerable extent by adjusting the composition of a flux to be filled and, at the same time, the carbon contents in sheath-forming soft steel and a lubricant still remaining on the sheath. Therefore, the flux-cored wire electrode according to this invention can enjoy such extremely-practical advantages, including an improvement to the atmosphere of the welding site in effecting arc-welding work with a shielding gas and a reduction to expenses for fume-removing facilities.

Figure 9:
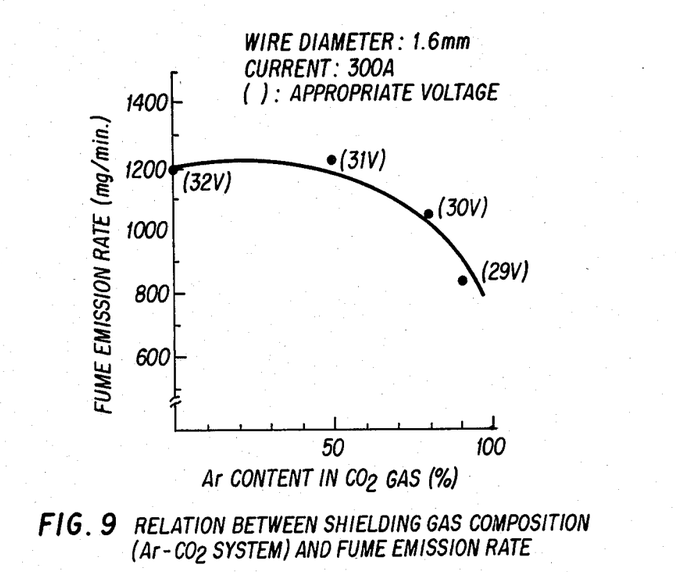
FIG. 9 is a diagram showing the relationship between Ar content in $CO_2$ gas and fume emission rate.
Figure 10:
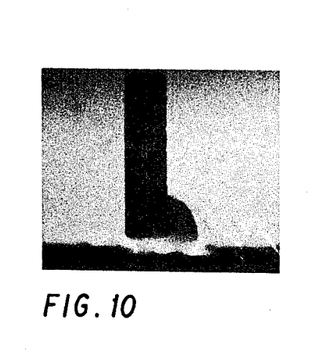
Figure 11:
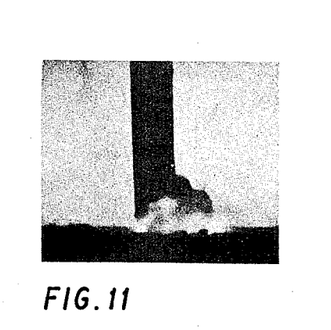
Figure 12:
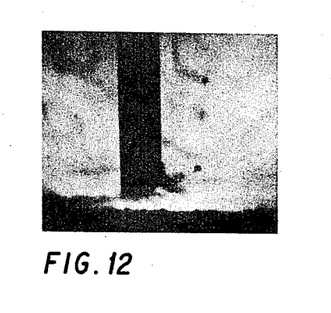

Furthermore, Ar has an effect to reduce the fume emission rate as illustrated in FIG. 9. Accordingly, it is effective to mix Ar gas in a shielding gas. Ar gas can exhibit its effect when added in an amount of 80% or more in the case of a $CO_2$-base shielding gas as illustrated in FIG. 9.

An example of this invention will next be described.

Using sheath-forming soft steels of compositions given in Table 1 and filling fluxes having compositions given in Table 3, flux-cored wire electrodes were produced. Lubricants given in Table 2 were also used. The carbon contents (relative to the total weights of sheath and lubricant) in the sheath-forming soft steels and the residual lubricants after production of the wire electrodes are also given in Table 3. The diameters of the wire electrodes were each 1.6 mm and their flux contents were respectively 15%. The wire electrode samples Nos. 1–13 had the cross-sectional shape shown in FIG. 8(A). The wire electrode sample no. 14 has the cross-sectional shape depicted in FIG. 8(B). On the other hand, the wire electrode sample No. 15 had the cross-sectional shape illustrated in FIG. 8(D). In the case of the wire electrode sample No. 15, a Cu plating was applied to a thickness of about 1 $\mu$m on the surface of its sheath made of the soft steel.

Using a variety of flux-cored wire electrodes obtained above, bead-on-plate welding was conducted under the below-given conditions. Fume emission rates were respectively measured in accordance with the same method as described above.

Welding conditions

Welding current: 300 A, DC(+)
Welding voltage: 32 V
Welding speed: 30 cm/min
Shielding gas: $CO_2$, 20 liters/min
Work piece: 0.12% C, 0.29% Si, 1.44% Mn, 0.020% P, 0.008% S, balance iron.
Distance between electrode tip and workpiece: 17 mm Results are shown in Table 4.

TABLE 1

| Sheath-forming soft steel | C | Mn | Si | P | S |
| --- | --- | --- | --- | --- | --- |
| A | 0.08 | 0.35 | 0.01 | 0.010 | 0.010 |
| B | 0.02 | 0.35 | 0.01 | 0.010 | 0.010 |
| C | 0.02 | 0.40 | 0.80 | 0.010 | 0.010 |

(unit: wt. %)

TABLE 2

| Lubricant | Type |
| --- | --- |
| a | Salt of higher fatty acid (calcium stearate) |
| b | $MoS_2$:graphite:$TiO_2$ = 3:4:3 (by weight ratio) |
| c | $MoS_2$:$TiO_2$ = 4:6 (by weight ratio) |

TABLE 3

Sample Wires

| | Flux composition (% based on total flux weight) | | | | | | | | | | | Types of sheath* and lubricant* | | |
| | | | | | | | Arc-stabilizing agent | | Deoxidizer | | | | Sheath metal (C-content %) | Lubricant (C-content %) | Total C-content (%) |
| No. | $TiO_2$ | $SiO_2$ | $Al_2O_3$ | $ZrO_2$ | $Fe_3O_4$ | MgO | NaF | $K_2SiO_3$ | Fe—Si | Mn | Fe—Al | Iron powder | | | |
| --- | --- | --- | --- | --- | --- | --- | --- | --- | --- | --- | --- | --- | --- | --- | --- |
| 1 | 40 | 5 | 0 | 0 | 1 | 0 | 2 | 0 | 10 | 15 | 0 | 27 | A (0.08) | b (0.02) | 0.10 |
| 2 | 40 | 10 | 6 | 4 | 1 | 2 | 1 | 0 | 10 | 15 | 0 | 11 | A (0.08) | b (0.02) | 0.10 |
| 3 | 40 | 7 | 4 | 2.5 | 1 | 2 | 2 | 0 | 10 | 15 | 0 | 17 | A (0.08) | b (0.02) | 0.10 |
| 4 | 45 | 10 | 4 | 4 | 1 | 2 | 0.5 | 0 | 10 | 15 | 0 | 8.5 | A (0.08) | b (0.02) | 0.10 |
| 5 | 40 | 0 | 2 | 0 | 3 | 0 | 5 | 2 | 15 | 10 | 0 | 23 | A (0.08) | b (0.02) | 0.10 |
| 6 | 40 | 5 | 0 | 0 | 1 | 0 | 2 | 0 | 10 | 15 | 0 | 27 | B (0.02) | b (0.02) | 0.04 |
| 7 | 40 | 0 | 2 | 0 | 3 | 0 | 5 | 2 | 15 | 10 | 0 | 23 | B (0.02) | b (0.02) | 0.04 |
| 8 | 40 | 10 | 6 | 4 | 1 | 2 | 1 | 0 | 10 | 15 | 0 | 11 | B (0.02) | b (0.02) | 0.04 |
| 9 | 40 | 10 | 6 | 4 | 1 | 2 | 1 | 0 | 10 | 15 | 0 | 11 | B (0.02) | c (0.02) | 0.02 |

TABLE 3-continued

| | Sample Wires | | | | | | | | | | | | | |
|---|---|---|---|---|---|---|---|---|---|---|---|---|---|---|
| | Flux composition (% based on total flux weight) | | | | | | | | | | | Types of sheath* and lubricant* | | |
| | | | | | | | Arc-stabilizing agent | | Deoxidizer | | | | Sheath metal (C-content %) | Lubricant (C-content %) | Total C-content (%) |
| No. | TiO₂ | SiO₂ | Al₂O₃ | ZrO₂ | Fe₃O₄ | MgO | Naf | K₂SiO₃ | Fe—Si | Mn | Fe—Al | Iron powder | | | |
| 10 | 30 | 15 | 3 | 10 | 5 | 0.2 | 0 | 3 | 10 | 15 | 0 | 6 | B (0.02) | b (0.02) | 0.04 |
| 11 | 40 | 5 | 2 | 8 | 1 | 5 | 1 | 0 | 8 | 15 | 3 | 12 | B (0.02) | b (0.02) | 0.04 |
| 12 | 25 | 6 | 2 | 10 | 3 | 10 | 1 | 0 | 8 | 15 | 3 | 17 | B (0.02) | a (0.01) | 0.03 |
| 13 | 40 | 10 | 6 | 4 | 1 | 2 | 1 | 0 | 10 | 15 | 0 | 11 | C (0.02) | c (trace) | 0.02 |
| 14 | 40 | 10 | 6 | 4 | 1 | 2 | 1 | 0 | 10 | 15 | 0 | 11 | B (0.02) | c (trace) | 0.02 |
| 15 | 40 | 10 | 6 | 4 | 1 | 2 | 1 | 0 | 10 | 15 | 0 | 11 | B (0.02) | a (0.01) | 0.03 |
| 16 | 15 | 10 | 0 | 0 | 10 | 0 | 2 | 0 | 10 | 15 | 0 | 38 | B (0.02) | b (0.02) | 0.04 |
| 17 | 35 | 0 | 2 | 0 | 3 | 0 | 3 | 5 | 15 | 10 | 0 | 29 | B (0.02) | b (0.02) | 0.04 |
| 18 | 30 | 5 | 3 | 8 | 4 | 9 | 1.5 | 0 | 7 | 14 | 2 | 16.5 | B (0.02) | b (0.02) | 0.04 |
| 19 | 37.5 | 3 | 1 | 5 | 4 | 2.5 | 1 | 0 | 9 | 17 | 1 | 19 | B (0.02) | b (0.02) | 0.04 |
| 20 | 40 | 10 | 0 | 4 | 0 | 0 | 1 | 0 | 10 | 15 | 0 | 20 | B (0.02) | b (0.02) | 0.04 |
| 21 | 40 | 10 | 0 | 4 | 0 | 0 | 1 | 0 | 10 | 15 | 0 | 20 | B (0.02) | c (trace) | 0.02 |

*based on the total weight of sheath

TABLE 4

| Wire electrode No. | | Fume emission rate (mg/min) |
|---|---|---|
| 1 | Comparative Example | 1380 |
| 2 | Comparative Example | 1174 |
| 3 | Comparative Example | 1242 |
| 4 | Comparative Example | 1103 |
| 5 | Comparative Example | 1585 |
| 6 | Comparative Example | 829 |
| 7 | Comparative Example | 951 |
| 8 | Example | 705 |
| 9 | Example | 602 |
| 10 | Example | 605 |
| 11 | Example | 640 |
| 12 | Example | 610 |
| 13 | Example | 603 |
| 14 | Example | 627 |
| 15 | Example | 615 |
| 16 | Comparative Example | 902 |
| 17 | Comparative Example | 1012 |
| 18 | Example | 607 |
| 19 | Example | 667 |
| 20 | Example | 756 |
| 21 | Example | 651 |

From the above experiment results, the following conclusions have been obtained:

(1) The wire electrode Nos. 1 and 5 are comparative examples as their flux compositions and the carbon contents of their sheath-forming metals and lubricants were respectively outside their corresponding ranges specified in the present invention. Their fume emission rates were extremely high.

(2) The wire electrode Nos. 2, 3 and 4 are comparative examples as their carbon contents were too much although their flux compositions where still within the flux composition range specified in the present invention. Compared with conventional flux-cored wire electrodes, their fume-reducing effects were limited to 10–20% only.

(3) The wire electrode Nos. 6, 7, 16 and 17 are comparative examples because their flux compositions were outside the flux composition range specified in the present invention although their carbon contents satisfied the requirement specified in the present invention. Their fume-reducing effects were insufficient.

(4) The wire electrode Nos. 8–15 and 18–21 were examples of this invention as each of the wire electrode samples satisfied the requirements specified in the present invention. Their fume emission rate were extremely little. In the wire electrode No. 13, the composition of the sheath-forming soft steel had been modified slightly. In the wire electrode Nos. 14 and 15, their cross-sectional shapes had been modified. High levels of fume-reducing effects were respectively achieved in all of the wire electrode Nos. 8–15 and 18–21.

Having now fully described the invention, it will be apparent to one of ordinary skill in the art that many changes and modifications can be made thereto without departing from the spirit or scope of the invention as set forth herein.

What is claimed is:

1. A flux-cored wire electrode suitable for use in gas-shielded arc-welding comprising a sheath of soft steel, a lubricant and a flux-core, wherein the sum of the carbon content of said sheath and lubricant is 0.045 wt.% or less of the total weight of said sheath, and wherein said sheath is filled with said flux to an amount of 10–30 wt.% of the total weight of said electrode, said flux consisting essentially of 20–50 wt.% of $TiO_2$, 1–15 wt.% of $SiO_2$, 2.5–10 wt.% of $ZrO_2$, 0.1–5 wt.% of an arc-stabilizing agent, 10–45 wt.% of a deoxidizer and up to 50 wt.% of iron powder.

2. The flux-cored wire electrode of claim 1, wherein said flux further includes 1–15 wt.% of $Al_2O_3$, 0.1–1.0 wt.% of MgO and 1–10 wt.% of iron oxides.

3. A flux-cored wire electrode as claimed in claim 1 or 2, wherein the carbon content in the flux is 0.2 wt.% or lower relative to the total weight of the flux.

4. A flux-cored wire electrode as claimed in claim 1 or 2, wherein the sheath defines an outer surface and is free of any seam thereon and is formed by plating to a thickness of 0.05–0.30 wt.% relative to the total weight of the wire electrode.

5. A flux-cored wire electrode as claimed in claim 4, wherein the plating is copper plating.

6. A flux-cored wire electrode as claimed in claim 1 or 2, wherein the flux is filled to an amount of 10–20 wt.% relative to the total weight of the wire electrode.

7. A flux-cored wire electrode as claimed in claim 1 or 2, wherein the lubricant is an $MoS_2$-base lubricant.

8. A flux-cored wire electrode as claimed in claim 1 or 2, wherein the gas-shielded arc-welding uses a $CO_2$ gas containing 80% or more of Ar gas as a shielding gas.

9. A flux-cored wire electrode as claimed in claim 1 or 2, wherein the gas-shielded arc-welding uses $CO_2$ gas as a shielding gas.

10. A flux-cored wire electrode as claimed in claim 1 or 2, wherein the sum of the carbon content in the sheath made of soft steel and the carbon content in the lubricant on the sheath is 0.02 wt.% or lower relative to the total weight of the sheath.

* * * * *